May 14, 1929.  E. F. WALSH ET AL  1,712,534
AUTOMATIC DUMPING BODY FOR MOTOR VEHICLES
Filed Jan. 28, 1925   4 Sheets-Sheet 1

Inventors
E. F. Walsh
W. E. Foust
Attorney

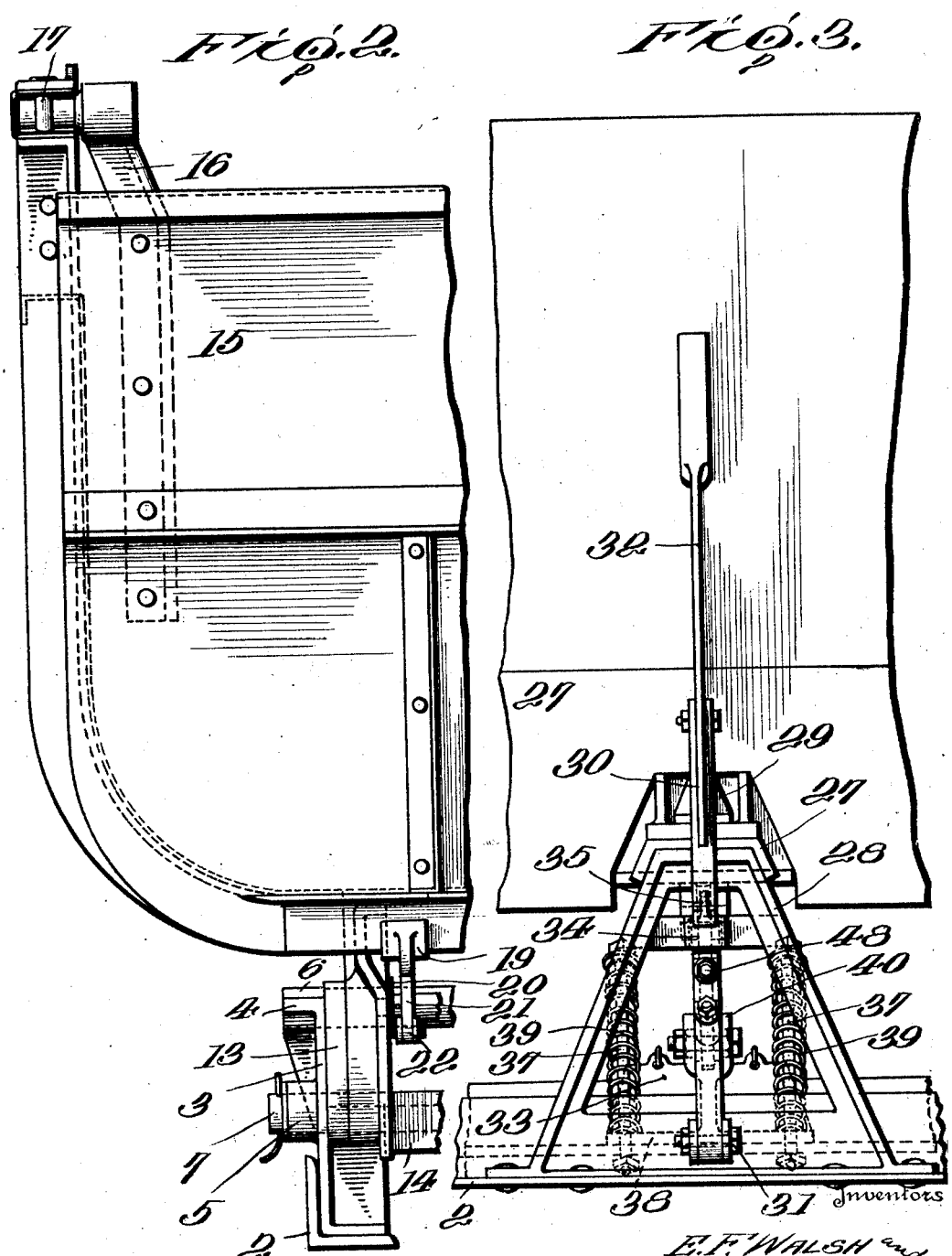

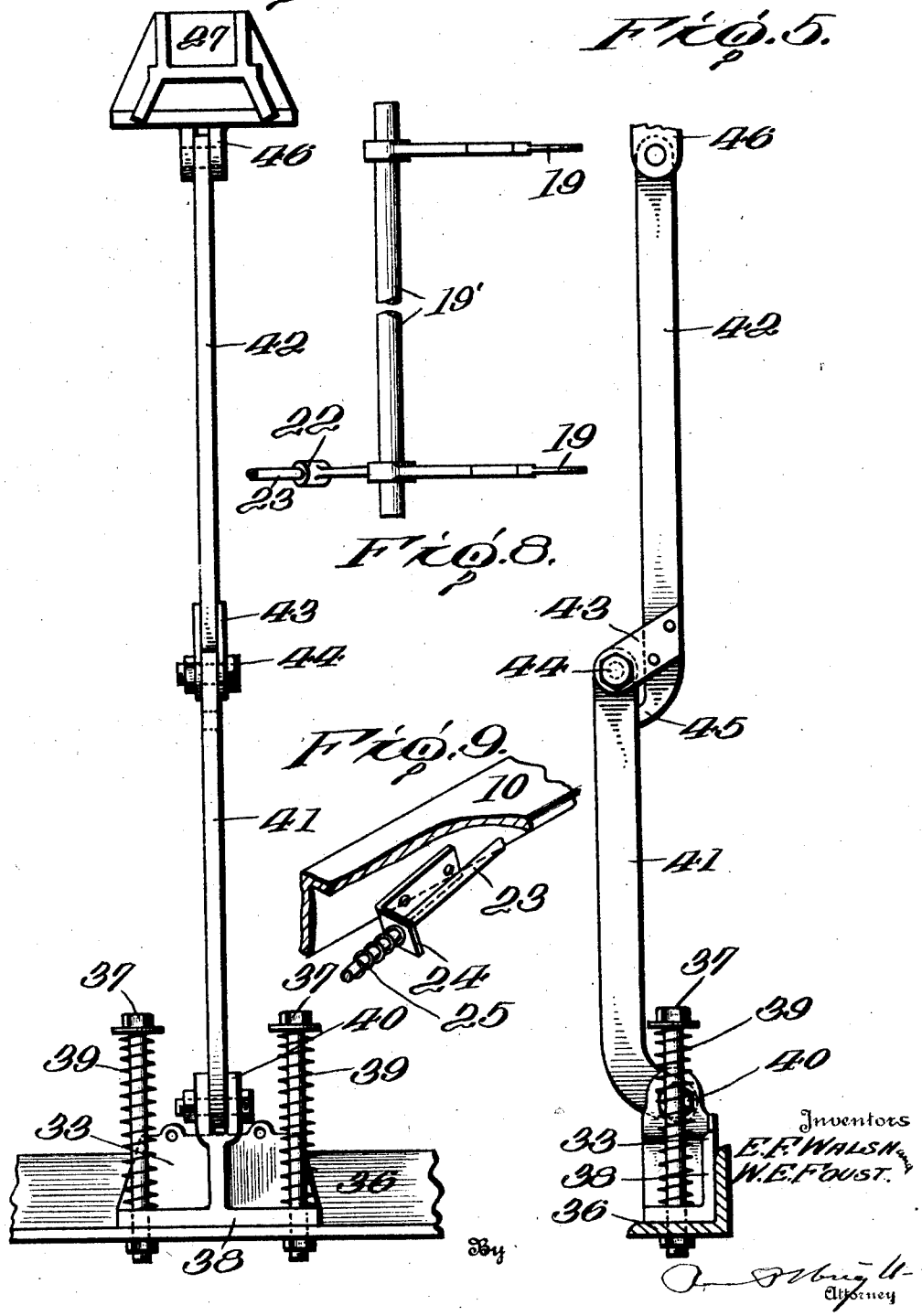

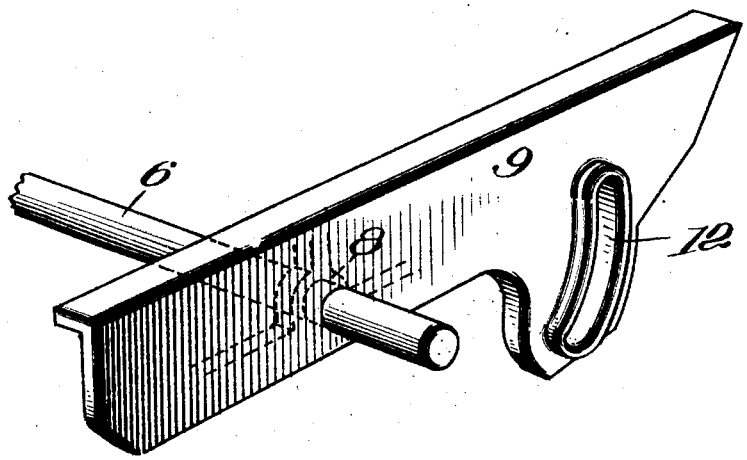
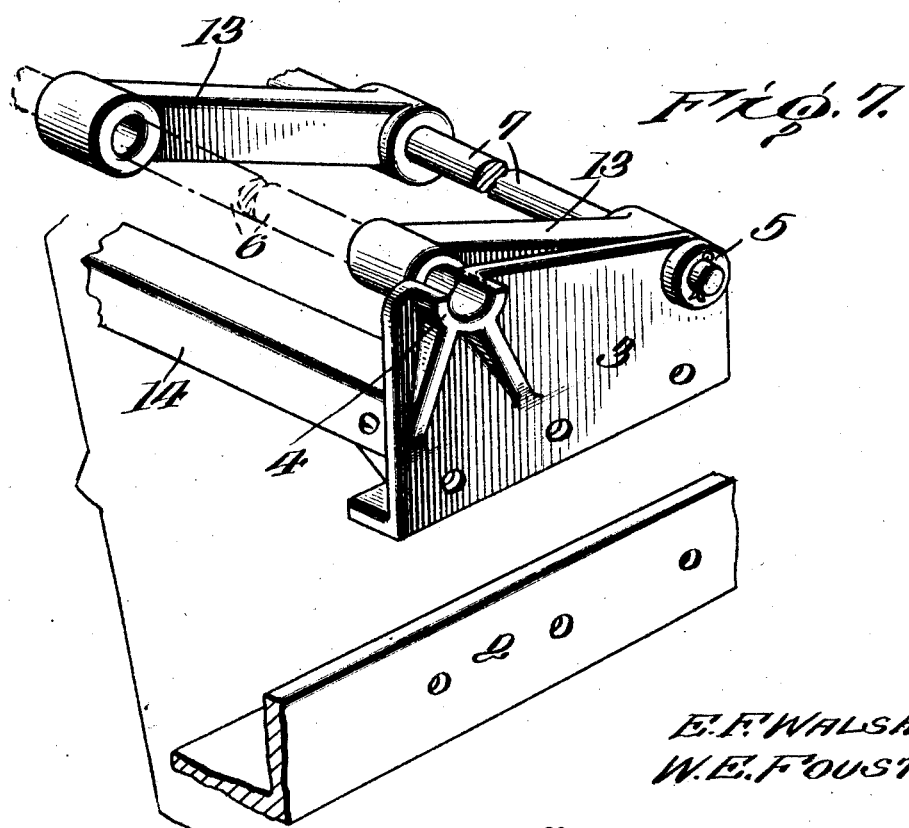

Patented May 14, 1929.

1,712,534

UNITED STATES PATENT OFFICE.

EDWARD F. WALSH AND WILLIAM E. FOUST, OF MARION, INDIANA.

AUTOMATIC DUMPING BODY FOR MOTOR VEHICLES.

Application filed January 28, 1925. Serial No. 5,341.

This invention relates to an automatic dumping body for motor vehicles such as motor trucks and the like and is an improvement on an application filed March 17, 1924, Serial Number 699,749, the object being to provide a motor vehicle with a dumping body which will act automatically when the body is released, the body being so mounted that it tilts by gravity when loaded and returns to its normal position when unloaded.

A further object of our invention is to improve the general construction by providing the frame carried by the motor vehicle and the frame of the body with a novel form of bearings so that the body moves on one fulcrum when loaded and swings on another fulcrum when unloaded, the body being held firmly in position at all times.

A further object of the invention is to improve the general construction of stiff arm for holding the body in raised or tilting position and to provide novel means for breaking the stiff arm to allow the body to return to the horizontal position after the load has been discharged.

Other and further objects and advantages of the invention will be hereinafter set forth and the novel features thereof defined by the appended claims.

In the drawings,

Figure 2 is a rear end elevation of a portion of the body;

Figure 3 is a detail front elevation;

Figure 4 is a front elevation of the stiff arm;

Figure 5 is a side elevation of the same;

Figure 6 is a perspective view of the upper bearing carried by the body of the motor vehicle;

Figure 7 is a detail perspective of the lower bearing and the connecting shafts;

Figure 8 is a top plan view of the tail gate latches showing the manner of carrying the same by a shaft; and Figure 9 is a detail perspective view showing the manner of mounting the tail gate operating rod.

Figure 1:
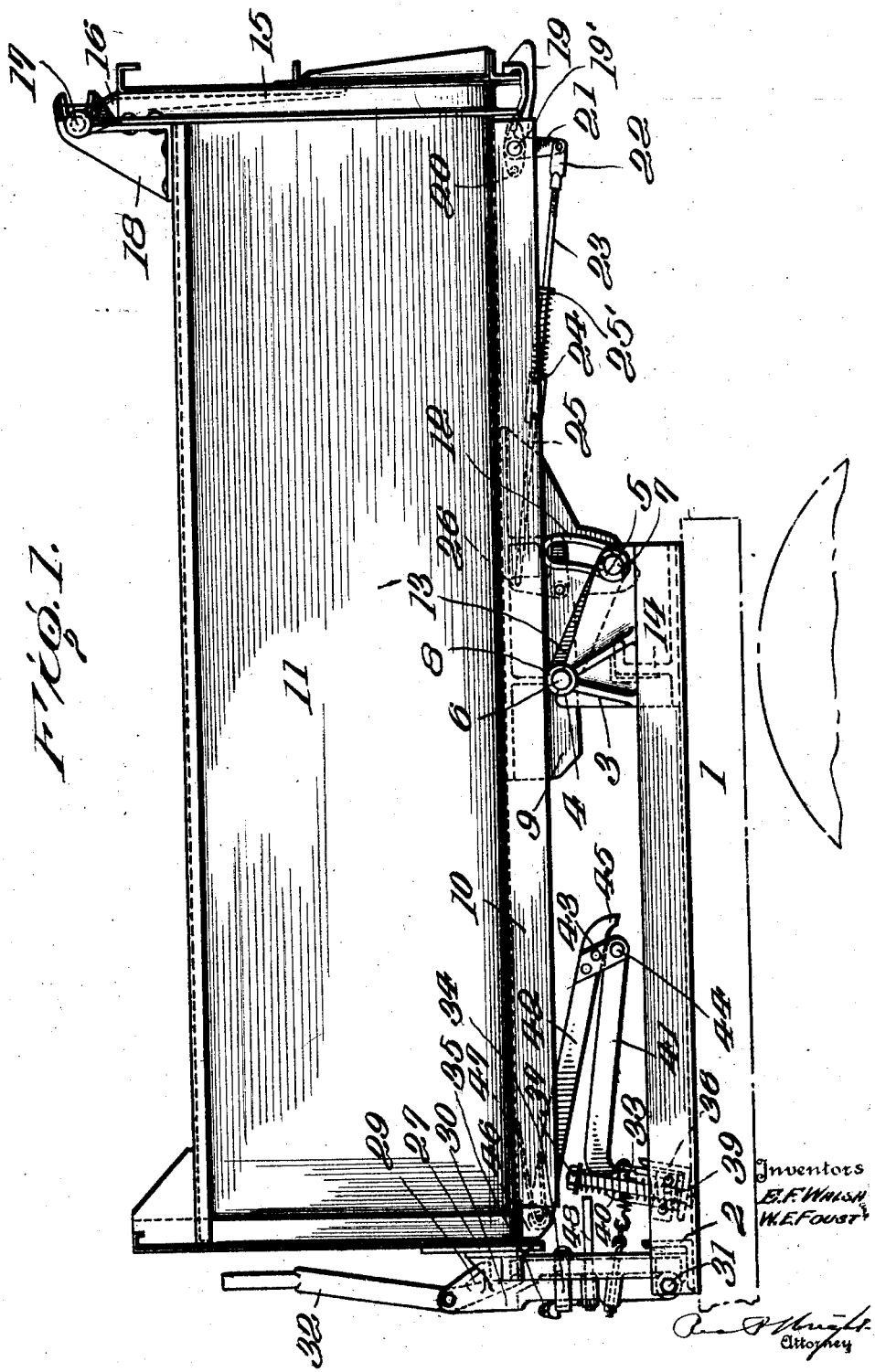
Figure 1 is a side elevation of a portion of a motor truck constructed in accordance with our invention showing the body in a horizontal position.

In the drawings 1 indicates the chassis of a motor truck on which is secured a frame 2 formed of angle irons and secured rigidly on the chassis by any suitable means, such as bolts and U bolts.

Secured between the side bars of the frame 2 at the rear end are upwardly extending bearings 3 having semi-circular bearings 4 and circular bearings 5 in which are arranged transversely extending shafts 6 and 7. The shaft 6 extends through circular bearings 8 formed in depending bearing members 9 arranged between longitudinally disposed sills 10 of a metal body 11. The shaft 7 extends through slots 12 formed in the bearing members 9 and these shafts are connected together adjacent each end by links 13.

From the above it will be seen that the shaft 7 is mounted in a circular bearing on the bearing member 3 and travels in a curved slot 12 in the bearing member 9 and that the shaft 6 is mounted in circular bearings in the bearing member 9 and is seated in semi-circular bearings 4 formed in the bearings 3 so that when the body is tilted, the fulcrum is changed, which allows the body to discharge its load and when discharged to return back into a horizontal position automatically.

The bearing plates 3 are connected together by angle irons 14 so as to form a rigid structure. The body at its rear end is provided with a swinging tail gate 15 carried by arms 16 which is provided with trunnions 17 mounted in bearings carried by brackets 18 and the lower end of the tail gate is adapted to be engaged by pivoted latches 19 so as to hold the tail gate in a closed position. These latches are fixed on a transverse shaft 19' mounted in suitable bearings 20 and one is provided with a depending arm 21 mounted on threaded rod 23 which extends through a bearing 24 carried by one of the sills 10 and is pivotally connected to bell crank lever 26 mounted on a bearing pin carried by the member 9, the other arm of which is arranged opposite a curved slot 12 so that when the body is moved into inclined or tilted position, the bell crank lever will be engaged by the shaft 7 to release the latches 19 in order to allow the body to discharge its load and when returned to its horizontal position, the tail gate, by its weight, rides over the inclined edge of the latches 19 and locks itself automatically.

The rod 23 is surrounded by a coiled spring 25, one end of which engages the bearing 24 and the other end a stop 25′ carried by the rod 23 so as to normally hold the latches in raised position.

The forward end of the body 11 has secured thereto a keeper 27 which rests upon a supporting member 28 carried by the cross bar of frame 2 and is also engaged by a latch 29 formed on the upper end of a lever 30 which is pivoted at 31. The lever 30 is provided with a pivoted hand lever 32 so constructed that the tail end of the lever engages the keeper so that the latch can be thrown out of engagement with the keeper in order to release the body, the latch being normally held in the position shown by a pair of coil springs 33.

The lever 30 works through a yoke 34 so that a wedge member 35 can be dropped in the end of the yoke to rigidly lock the lever in its inward position so that all danger of the body being accidentally released is prevented, but it is, of course, understood that the use of this additional locking means is unnecessary as the lever 30 being held by the springs 33 assures the body being locked in a horizontal position.

Extending between the side bars of the frame 2 at their forward ends is an angle iron 36 through which extend a pair of bolts 37 carrying a member 38 and surrounded by coil springs 39. The member 38 is provided with a bifurcated bearing 40 between which is pivotally mounted at the lower end, a sectional stiff arm formed of sections 41 and 42, the section 42 carrying a pair of arms 43 between which the upper end of the arm 41 is pivotally mounted by a bolt 44. The lower end of the arm 42 is offset as shown at 45 to engage the arm 41.

The keeper 27 is provided with a bifurcated ear 46 between which is pivotally mounted the upper end of the arm 42. A suitable spring 47 is disposed under the body and around the bearing of the arm 42 and engages the arm as clearly shown so as to have the tendency to force the arm downwardly.

The yieldable connection as shown at the lower end of the stiff arm to the frame provides means for checking or cushioning the upward movement of the body so that the movement is retarded. This in reality provides a shock absorber to relieve the excessive strain when the body moves into an inclined position to dump its load.

The lever 30 carries a kick-off arm 48 which is adapted to engage the stiff arm and break the joint by moving the hand lever 32 so as to allow the body to move back into a horizontal position after the load has been discharged.

In the operation of our improved construction of automatic dumping body for motor trucks, assuming that the body is loaded and is in the position as shown in Figure 1, when the hand lever is moved forwardly, the latch is released and as the fulcrum of the body is to one side of the longitudinal center, the body automatically moves into an inclined position to dump its load, the upward movement being retarded by the stiff arm, which, when straightened out, supports the body in an inclined position. As the body moves into an inclined position, the bell crank lever 26 engages the shaft 7 so as to release the tail latches and to allow the tail gate to swing outwardly. As the body moves into an inclined position, the fulcrum of the body changes from the shaft 6 to the shaft 7 and as the shaft 7 is to the other side of the transverse center of the body, the body will return automatically to a horizontal position when released by the stiff arm. The operator forces the lever backwardly so as to force the kick-off arm into engagement with the stiff arm, which breaks the stiff arm and the body then returns to a horizontal position.

From the foregoing description it will be seen that when the body is loaded and in a horizontal position, it is supported at its front end by the support carried by the frame and locked in that position by the body latch so that when the latch is pulled forward, the body is unlatched. As the shaft 6 is disposed forward of the center of the body, the body tips until it reaches an angle of about 27° when the shaft 7 comes in contact with the top bearing in slot 12 so that the pivot changes from shaft 6 to shaft 7, shaft 6 rising out of the half bearing and the body continues to tip on the fulcrum 7 until the stiff arm or stiff leg stops upward movement at about 45°, the tail gate latch operating exactly the time that the body changes from one fulcrum to the other. After the load has been discharged from the body, the body by its own weight, returns to a horizontal position, changing the fulcrum from one shaft to the other on its return trip.

What we claim is:—

1. A motor truck having a chassis, bearings arranged in a plane above said chassis, one of said bearings being circular and the other semi-circular, a body having depending bearing members, said bearing members having circular bearings and curved slots, a shaft carried by the bearing members of the chassis working through said slots, a shaft carried by the bearing members of said body adapted to rest within the semi-circular bearings, said body being adapted to initially swing on the shaft carried by the body when moving into inclined position to dump its load and to initially swing on the shaft carried by the bearing members of the chassis to automatically return to horizontal position.

2. A motor truck having a chassis, an auxiliary frame fixed on said chassis having at its rear end a pair of upwardly extending bearing members connected together, said bearing members being provided with circular bearings and semi-circular bearings, a body having depending bearing members provided with circular bearings and curved slots, transversely arranged shafts extending through the circular bearings of said bearing members, the shaft of the chassis bearing members working through the slots of the body bearing members and the shaft of the body bearing members working in the semi-circular bearings to provide a means whereby the body may be adapted to swing initially on one of said shafts when loaded and to initially swing on the other shaft when unloaded to return said body to horizontal position.

3. A motor truck having a chassis, an auxiliary frame carried by said chassis, a pair of bearing members extending upwardly from said auxiliary frame, a bar connecting said bearing members, said bearing members being provided with circular bearings carrying a transversely arranged shaft and semi-circular bearings, a body having depending bearing members provided with circular bearing members carrying a transversely arranged shaft adapted to fit within the semi-circular bearings of the first mentioned bearing member, the first mentioned shaft extending through curved slots formed in the second mentioned bearing shaft and links connecting said shafts.

4. A motor truck having a body mounted on spaced horizontally disposed shafts to provide two fulcrum bearings for said body to allow said body to automatically move into inclined position to dump its load and to return to a horizontal position, said body having a swinging tail gate, pivoted latches engaging said tail gate, a bell crank lever, one of said shafts being arranged in the path of said bell crank, a connection between said bell crank lever and said latches whereby said latches will be automatically released when said body moves into an inclined position to dump its load.

5. A motor truck having a body mounted on two fulcrums adapted to first swing on one fulcrum to dump its load and to first swing on another fulcrum to return to horizontal position, said body having a pivoted tail gate, pivoted latches for holding said tail gate in closed position and a bell crank lever having a connection with said latches adapted to be engaged by one of said fulcrums when said body is moved into inclined position to release said latches.

6. A motor truck comprising a chassis having a body pivotally mounted on a pair of shafts, said body having a pivoted tail gate, a latch for locking said tail gate, a bell crank for operating said latch, said bell crank being operated by coming in contact with one of said shafts for releasing said latches when said body is moved into inclined position.

In testimony whereof we hereunto affix our signatures.

EDWARD F. WALSH.
WILLIAM E. FOUST.